United States Patent [19]

Nakai et al.

[11] 4,199,245
[45] Apr. 22, 1980

[54] POWER SOURCE SWITCH FOR CAMERAS

[75] Inventors: Masaaki Nakai, Nara; Yasuzi Kogure, Kawanishi; Masayoshi Sahara, Sennan; Toshio Kobori, Sakai, all of Japan

[73] Assignee: Minolta Camera Kabushiki Kaisha, Osaka, Japan

[21] Appl. No.: 934,126

[22] Filed: Aug. 16, 1978

[30] Foreign Application Priority Data

Aug. 19, 1977 [JP] Japan .................................. 52-98779

[51] Int. Cl.² ............................................. G03B 17/38
[52] U.S. Cl. .................................................. 354/266
[58] Field of Search .............. 354/266, 267, 135, 60 R

[56] References Cited

U.S. PATENT DOCUMENTS

| 3,211,069 | 10/1965 | Rixton | 354/135 |
| 3,599,548 | 8/1971 | Hennig | 354/266 X |
| 3,678,821 | 7/1972 | Kitai | 354/60 R X |
| 3,810,228 | 5/1974 | Taguchi et al. | 354/60 R X |
| 3,868,700 | 2/1975 | Kuramoto | 354/23 R |

FOREIGN PATENT DOCUMENTS 2734725 2/1978 Fed. Rep. of Germany .......... 354/266

Primary Examiner—Michael L. Gellner
Attorney, Agent, or Firm—Wolder, Gross & Yavner

[57] ABSTRACT

In a still or motion picture camera including an electric circuit such as a light measuring circuit, an exposure control circuit, a sound recording circuit, or a capstan driving circuit, the shutter release button is provided with a piezo-electric element for developing an electric charge or potential difference when an external pressure is applied thereon. The pressure responsive piezo-electric element is connected in the electric circuit in response to the pressure applied on the pressure responsive element, whereby the electric circuit is enabled prior to the commencement of the exposure.

19 Claims, 2 Drawing Figures

POWER SOURCE SWITCH FOR CAMERAS

BACKGROUND OF THE INVENTION

The present invention relates generally to improvemenets in camera electrical devices and it relates more particularly to an improved power supply switch device for a camera having an electric circuit that should be energized prior to the commencement of an exposure, such as in the case of a still camera having a light measuring circuit, an exposure control circuit or the like, or in the case of a movie camera having a sound recording circuit or a capstan driving circuit.

It is a well known practice to provide on a camera a power supply switch of the subject type which is opened and closed in conjunction with the reciprocating movement of the shutter release button for the purpose of preventing the switch from being left on or off.

The conventional mechanism, however, has certain defects in that an exposure or a sound recording may be improperly effected when the shutter release member is operated abruptly to actuate the shutter mechanism before the operation of the electric circuit thereof is sufficiently stabilized.

U.S. patent application Ser. No. 818,634, filed July 25, 1977 and assigned to the same assignee, discloses a power switch device which is turned on in response to the conductivity of the skin of the finger at the moment of the photographer touching the release button with his finger in order to overcome the above defects. The power switch device disclosed in the above application is the so-called "finger-touch responsive switch".

The power switch device disclosed in the aforesaid application has two input terminals, both related to the shutter release button, in one form the switch input terminals being connected to mutually insulated coaxial members forming part of the release button and exposed at their top and in another form such terminals being connected respectively to the camera body and an electrically insulated top exposed portion of the release button. Thus, when the release button is touched by a photographer, the switch for controlling the power supply to the camera electric circuit is electrically closed in response to the conductivity of the skin of the photographer's finger, whereby the electric circuit is supplied with electric power and energized or activated.

However, the above finger-touch responsive switch device possesses the defect that it will not operate if the photographer wears gloves. Further, with the structure disclosed in the above application, the switch may be continuously maintained in its "on" state in the event that moisture such as the sweat of the photographer or some rain drops fills the area between the two contact portions to the input terminals. This results in the waste of electric power in spite of the photographer's desire.

Furthermore, with the switch device of the above application, both contact portions which are respectively connected to the input terminals may be corroded by moisture such as sweat or the like because they are exposed externally of the camera body. As a result, the switch cannot be turned on even if the photographer touches the shutter release button with his finger.

SUMMARY OF THE INVENTION

An object of the present invention is to provide an improved power switch device for use in a camera which switch is closed prior to the actuation of the camera shutter release member by the slight touch of the photographer's finger independently of the resistance of the photographer's finger and even if the photographer wears gloves.

Another object of the present invention is to provide a camera including a finger-touch responsive switch that minimizes or eliminates any waste of electrical power.

A further object of the present invention is to provide a camera including an improved finger-touch responsive switch of great reliabiiity and durability.

The mechanism of the present invention is characterized by a switch device that may be closed to supply electric power to a camera circuit in response to the pressure produced when a finger is even lightly applied to the shutter button, the switch device comprising a pressure responsive semi-conductor element disposed within the shutter release button and exhibiting a piezo-electric effect so as to generate an electric force when a slight external pressure is applied thereto.

DETAILED DESCRIPTION OF THE PREFERRED EMBODIMENT

Figure 1:
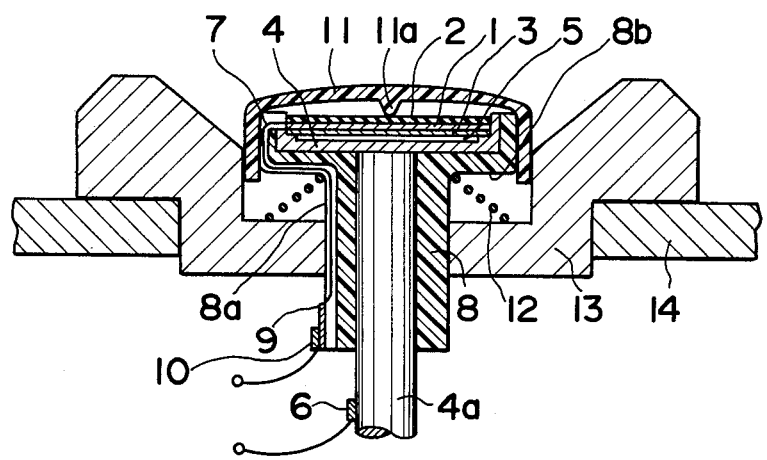
FIG. 1 is a longitudinal sectional view of the shutter release assembly in accordance with an embodiment of the present invention.
Figure 2:
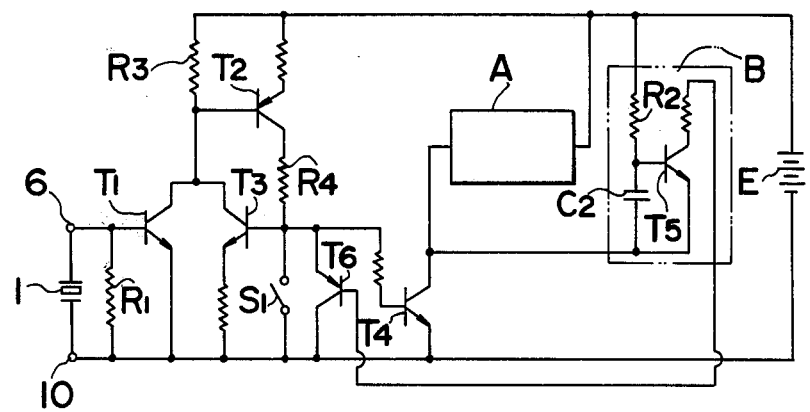
FIG. 2 is a circuit diagram showing an example of the electric circuit for closing a power supply circuit in response to the operation of the structure of FIG. 1.

Referring now to the drawings which illustrate a preferred embodiment of the present invention, FIG. 1 is a longitudinal sectional view of a shutter release member having a built in piezo-electric element 1 and FIG. 2 is an associated power circuit in which power is supplied in response to the operation of the piezo-electric element 1 to an electric unit including a light measurement display circuit or an exposure control circuit.

As seen in FIG. 1, piezo-electric element 1 develops an electric charge or potential difference between its upper and lower surfaces when it is subjected to a mechanical strain by a light external force of stress exerted thereon.

The element 1 comprises a so-called semi-conductor element possessing piezo-electric properties, and is cut in the form of a thin film or formed into a sheet, as shown in the drawing. A piezo-electric element of this type may be, for example, the Kureha KEPIEZO film (brand name used in Japan) developed by Kureha Chemical Industry Co., Ltd., Japan. Piezo-electric element 1 has bonded to its top surface a rubber-like elastic or elastomeric insulating material 2 and has its bottom surface coated with a conductive material 3, for example, a conductive metal such as aluminum film, so that a laminated structure is formed. The bottom of the electrode defining conductive material 3 is supported at its borders by a support member 4 to provide a space 5 therebetween for allowing the slight flexure of the laminated structure. Support member 4 is constructed integrally with the camera shutter release shaft 4a, both of which are made of conductive metal such as aluminum and are in contact with electrode 3 on the piezo-electric element 1 to act as a terminal for one polarity of the piezo-electric element generated charge which is connected by a contactor 6 slidably engaging the shutter release shaft 4a to an electric circuit to be later described.

A lead wire 7 functioning as the other terminal for conducting the other piezo-electric charge polarity extends from the contact surface between piezo-electric element 1 and elastic insulating material 2, through a groove 8a formed on the outer surface of a sleeve 8 made of an electrically insulating material such as hard plastic material and coaxially engaging shutter release shaft 4a, to a contact 9 bonded on the outer surface of sleeve 8. The lead wire 7 is connected by a contactor 10 which slidably engages or is bonded to contact 9 to the hereinafter described electric circuit.

A shutter button cover or cap 11, made of a relatively elastic plastic material and having a depending central projection 11a engaging the elastic insulating material 2, covers piezo-electric element 1, supporting member 4 and peripheral flange 8b of sleeve 8 to thereby protect the assembly from drops of water or other moisture and from dust, and at the same time, the shutter button cover is vertically flexible toward the camera shutter button seat 13 which is fixed to a camera body 14. A spring 12 entrapped between flange 8b and shutter button seat 13 constantly upwardly resiliently biases shutter release shaft 4a.

Accordingly, when the shutter button cover 11 is slightly touched by a finger, spring 12 remains uncompressed, and the light external force by the finger thereon is applied centrally through projection 11a and elastic insulating material 2 to piezo-electric element 1, and the voltage generated between the ends of piezo-electric element 1 appears between contactors 6 and 10.

In the electric circuit shown in FIG. 2, the emitter-base of a first transistor T1 is connected in parallel with a resistor R1 which in turn is connected between the contactors 6 and 10. The collector of first transistor T1 is connected to the base of a second transistor T2. A resistor R3 connected between the base-emitter of the second transistor T2 is connected to the positive pole of an electric power source or battery E, while the collector of the second transistor T2 is connected through resistor R4 to the respective bases of a third transistor T3 and a fourth transistor T4. The third transistor T3 is arranged in parallel with the first transistor T1, the collectors of both transistors T3 and T1 being connected to each other, and the third transistor T3 functioning as a holding element for maintaining the transistor T2 in an ON condition upon the transistor T1 being turned on. The emitter of fourth transistor T4 is connected to the negative pole of power source E and the collector of the fourth transistor T4 is connected to the positive pole of power source E through light measuring and indicating circuit A and timer circuit B including capacitor C2 and resistor R2, the latter two being in parallel connection with light measuring and indicating circuit A. The junction point between capacitor C2 and resistor R2 is connected to the base of a fifth transistor T5, and the emitter of the said fifth transistor T5 is connected in parallel with capacitor C2, the collector of the fifth transistor T5 being connected to the base of a sixth transistor T6 whose emitter-collector is connected between the resistor R4 and the negative pole of power source E. A switch S1 is connected between the emitter and collector at the sixth transistor T6. The emitters of the transistors T1 and T3 and contactor 10 are all connected to the negative pole of power source E and resistor R1 is connected between the emitter and base of transistor T1.

In the electric circuit described above, when the piezo-electric element 1 generates an electric charge or foce, a voltage occurs across resistor R1, which voltage is of differentiation wave-form and is applied to the base of first transistor T1 at a polarity at which the first transistor T1 is turned on, with its collector current flowing through resistor R3, across which a voltage develops to turn on second transistor T2. Turning-on of the second transistor T2 increases the base voltages of third and fourth transistors T3 and T4, both of which are then turned on. The third transistor T3 connected in parallel with first transistor T1 maintains second transistor T2 turned on even when the input signal to the first transistor T1 is stopped. Turning-on of the aforesaid fourth transistor T4 causes its collector current to effect the supply of energizing electric current to light measurement display circuit A for displaying the light measurement value, and at the same time, causing current to flow to capacitor C2 and resistor R2 of timer circiuit B, thereby starting to charge capacitor C2.

When capacitor C2 is charged to a predetermined level, the fifth transistor T5 is turned on, with its collector current turning on sixth transistor T6, causing the base potential of third and fourth transistors T3 and T4 to drop to thereby turn off these transistors. Therefore, if, at this time, there occurs no voltage of the differentiation wave-form resulting from electric force generated by piezo-electric element 1, second transistor T2 is turned off, and all the circuitry returns to its unoperated or inactive condition after the lapse of a predetermined time. Switch S1 is provided to discontinue the power supply to the light measurement circuit for stopping the light measurement display operation prior to the lapse of the time preset by timer circuit B. All the circuitry returns to its unoperated or inactive condition, when switch S1 is closed at once. Switch S1 may be manually independently operated or may, for example, be closed in linkage with the shutter opening or closure. It is to be noted that in the above described electric circuit an exposure control circuit responsive to the output from a light measurement circuit or to manually set values may be provided in place of the timer circuit so as to turn on sixth transistor T6 by means of the output from the exposure control circuit. In this case, shutter closure signals or diaphragm aperture stop signals are of use for such outputs.

While the above described embodiment employs a power supply switch for use in a light measuring and indicating circuit for a camera, it is understood that the application of the present invention is not limited to such a case where indication of measured light values is made without actuating the camera. Alternatively, in a memory-type electric shutter circuit in which the output of a light measuring circuit is stored by a capacitor and the shutter is controlled in accordance with the stored output, for example, the piezo-electric switch according to the present invention can be applied as a power supply switch for controlling the power supply to the light measuring circuit and the storage circuit. In these modifications, light measuring and storage may be carried out prior to the actual shutter release for the commencement of exposure, in other words, the film exposure is always started after the measured light value has been sufficiently and correctly stored.

Furthermore, when the present invention is applied to the release button of a movie camera provided with a coincidental sound recording unit, the piezo-electric switch may be arranged such that it closes the power supply circuit to a coincidental sound recording circuit or a capstan drive circuit, such sound recording unit or capstan drive unit (generally, it takes a certain period of time for these units to become stable) may be stabilized before the commencement of film exposure without the need for a switch to be closed in conjunction with the shutter release button depression, as required with the conventional switch.

As shown in the above embodiment, an electric switch according to the present invention, when used in a camera provided with electric units, such as a still camera having a light measuring and indicating circuit and a movie-camera including a recording unit or capstan drive unit, allows the power switch of the circuitry in the electric unit to be closed only by a light finger touch on the shutter button prior to the pressure or depression of the shutter button, and thereby the electric unit starts to operate in a stable condition and remains properly operative. The power switch is assuredly opened after a lapse of a given time, thereby remaining operative properly at all times without any hindrance to its opening and closing operations due to sweat, rainwater, moisture or dust.

While there has been described and illustrated a preferred embodiment of the present invention, it is apparent that numerous alterations, omissions and conditions may be made without departing from the spirit thereof.

We claim:

1. In a camera including a shutter release and an electrical network and an electric current source for energizing said network, a switching device for connecting said current source to said network comprising a semi-conductor switch circuit having a controlled output connected between said network and current source and an electric signal control input and a mechanical electrical transducer responsive to pressure applied thereto and positioned where pressure is applied attendant to the initiation of said shutter release and having an electrical output coupled to said semi-conductor switch circuit input.

2. The switching device of claim 1 wherein said transducer comprises a piezo-electric element.

3. The switching device of claim 2 wherein said shutter release includes a release member movable from a retracted to an exposure initiating advance position and having an exposed manually accessible outer end, said piezo-electric element being mounted on said release member outer end.

4. The switching device of claim 2 wherein said semiconductor switch circuit includes means for maintaining said switch circuit in a closed condition upon the closing thereof in response to a signal from said piezoelectric element.

5. The switching device of claim 4 including means for opening said switch circuit a predetermined time after the closing thereof.

6. The switching device of claim 4 including means for opening said switch in response to a predetermined operation after the closing of said switch circuit.

7. The switching device of claim 2 wherein said shutter release includes a shutter release member manually movable from a retracted to an exposure initiating advanced condition, said piezo-electric element being positioned on said shutter release member.

8. A camera, comprising:
an electric circuit to be energized prior to the commencement of an exposure;
an electric power source;
a switching circuit connected between said electric circuit and power source for controlling the supply of power to said electric circuit, said switching circuit having two terminals and being switched to a closed condition from an open condition when an electric signal is applied between said terminals; and
a piezo-electric element developing said electric signal upon the application of pressure thereto, said element being provided at a position where pressure is applied thereto by a finger positioned to act on the camera for a shutter release operation.

9. A camera as set forth in claim 1, wherein said camera further comprises a shutter release member manually movable from a retracted to an exposure initiating advanced condition, said piezo-electric element being provided on said shutter release member.

10. A camera as set forth in claim 9, said switching circuit including a main transistor having an energized condition allowing the power supply to energize said electric circuit and a deenergized condition to cut off the power supply to said electric circuit, said main transistor being connected so as to be energized when said element generates an electric force, and a control transistor being connected so as to be energized when said main transistor is in energized condition and to maintain said main transistor in its energized condition while said main transistor is energized, and wherein said camera further comprises a means for de-energizing said control transistor.

11. A camera as set forth in claim 10, said means including a timer circuit connected to said switching circuit so as to generate a predetermined output signal after the lapse of a predetermined time from the time when said main transistor is energized, and a transistor connected between said timer circuit and control transistor so as to short the base-emitter of said control transistor in response to said output signal.

12. A camera as set forth in claim 10, said means including a switch connected to said control transistor so as to short the base-emitter of said control transistor when said switch is operated, said switch being operated in response to the commencement of the exposure.

13. A camera as set forth in claim 9, said element comprising a thin sheet member with upper and lower surfaces defining opposite piezo-electric charged poles,
said shutter release member including a core member formed of an electrically conductive material and having a portion at its top and for receiving said element and being electrically connected to said lower surface of said element, a tubular member surrounding said core member, and formed of an electrically insulating material and movable integrally with said core member, and an electrically conductive member provided on the outer periphery of said tubular member, said electrically conductive member being connected to upper surface of said element, and
said two terminals being respectively connected to said core member and electrically conductive member.

14. A camera as set forth in claim 13, wherein said camera further comprises an insulating sheet member formed of an elastic insulating material and provided on said element so as to shield said upper surface of said element.

15. A camera as set forth in claim 14, wherein said camera further comprises an electrically conductive sheet member provided on said element so as to shield the lower surfaces of said element, and an elastic cover member provided on said shutter release member so as to cover the top end thereof, said cover member having an integral projecting portion engaging said insulating sheet member;

said core member having a recess at its receiving portion so as to provide a space under said electrically conductive sheet member.

16. A camera comprising:
an electric circuit to be energized prior to the commencement of the exposure;
an electric power source;
a control circuit for controlling the power supply from said power source to said electric circuit, said control circuit having a de-energized condition and an energized condition to supply the electric power to said electric circuit, said control circuit being energized when an electric signal is applied thereto;
a mechanical electrical transducer developing an electric signal responsive to pressure applied thereto, said transducer being electrically connected to said control circuit so as to transmit the electric signal to said control circuit, said transducer being provided at a position where pressure is applied thereto by a finger serving to effect the shutter release operation of the camera;
a maintaining circuit for maintaining said control circuit in said energized condition upon said energization thereof; and
means for de-energizing said maintaining circuit.

17. A camera as set forth in claim 16, wherein said mechanical electrical transducer includes a piezo-electric element developing an electric force upon the application of pressure thereto.

18. A camera as set forth in claim 16, further comprising a shutter release member manually movable from a retracted to an exposure initiating advanced position, and wherein said piezo-electric element is provided on said shutter release member.

19. A camera as set forth in claim 16, wherein said means includes a timer circuit for de-energizing said maintaining circuit a predetermined time after the energization of said maintaining circuit.

* * * * *